United States Patent [19]
Jensen et al.

[11] Patent Number: 5,305,104
[45] Date of Patent: Apr. 19, 1994

[54] DIGITALLY ASSISTED MOTION COMPENSATED DEINTERLACING FOR ENHANCED DEFINITION TELEVISION

[75] Inventors: Daryl K. Jensen, New York, N.Y.; Dimitris Anastassiou, Tenafly, N.J.

[73] Assignee: The Trustees of Columbia University in the City of New York, New York, N.Y.

[21] Appl. No.: 919,857

[22] Filed: Jul. 27, 1992

[51] Int. Cl.$^5$ ............................................. H04N 7/08
[52] U.S. Cl. .................................. 348/473; 348/469; 348/441
[58] Field of Search .................. 358/140, 11, 141, 142; H04N 7/08

[56] References Cited

U.S. PATENT DOCUMENTS

| | | | |
|---|---|---|---|
| 4,897,720 | 1/1990 | Wu et al. | 358/136 |
| 4,916,525 | 4/1990 | Drummond | 358/12 |
| 4,926,244 | 5/1990 | Isnardi | 358/12 |
| 4,967,263 | 10/1990 | Dieterich | 358/11 |
| 4,980,764 | 12/1990 | Henot | 358/133 |
| 5,008,746 | 4/1991 | Bernard et al. | 358/140 X |
| 5,051,826 | 9/1991 | Ishii et al. | 358/140 |
| 5,134,480 | 7/1992 | Wang et al. | 358/140 |

OTHER PUBLICATIONS

M. A. Isnardi et al., "Encoding for Compatibility and Recoverability in the ACTV System", IEEE Transactions on Broadcasting, vol. BC-33 (1987), pp. 116-123.

S. N. Baron et al., "An Evolutionary Approach to Advanced Television Services: The ACTV (Advanced Compatible Television) System".

B. Girod et al., "Motion-compensating Field Interpolation from Interlaced and Non-interlaced Grids", 2nd International Technical Symposium on Optical and Electro-Optical Applied Science and Engineering: Image Processing Symposium, Cannes, Dec. 1985, pp. 1-8.

M. Pecot et al., "Compatible Coding of Television Images, Part 1: Coding Algorithm", Image Communication Journal (Speech Issue on HDTV), pp. 1-18.

G. W. Meeker, "High Definition and High Frame Rate Compatible N.T.S.C. Broadcast Television System", IEEE Transactions on Broadcasting, vol. 34 (1988), pp. 313-322.

T. Fukinuki et al., "Extended Definition TV Fully Compatible with Existing IEEE Transactions on Communications", vol. COM-32 (1984), pp. 948-953.

T. Fukinuki et al., "Extended Definition TV Fully Compatible with Existing Standards—Proposal and Experimental Results", 1984 Winter TV Conference, pp. 354-367.

W. F. Schreiber et al., "A Compatible High-Definition Television System Using the Noise-Margin Method of Hiding Enhancement Information", SMPTE Journal, Dec. 1989, pp. 873-879.

F. W. P. Vreeswijk et al., "An HD-MAC Coding System", in: L. Chiariglione, ed., Signal Processing of HDTV, Elsevier Science Publishers, B. V. (North Holland), 1988, pp. 137-143.

Y. Ninomiya et al., "An HDTV Broadcasting System Utilizing a Bandwidth Compression Technique-MUSE", IEEE Transactions on Broadcasting, BC-33 (4), Dec. 1987, pp. 130-160.

International Organisation for Standardisation, ISO-IEC/JTC1/SC29/WG11, Coded Representation of Picture and Audio Information, Document AV-C-260, May 1992, pp. 1, 25-29, 38-40, 60.

Primary Examiner—Victor R. Kostak
Attorney, Agent, or Firm—Brumbaugh, Graves, Donohue & Raymond

[57] ABSTRACT

In an Enhanced Definition Television (EDTV) system, an assistance signal is transmitted to enable a suitably equipped receiver to choose from a number of predetermined deinterlacing modes. The modes represent interpolation options for estimating lines missing in a current interlaced image field, thereby enhancing the vertical resolution of a display. For example, five options may be provided for as follows: (1) intra-frame linear interpolation, (2) use of information from a preceding frame, (3) use of information from a succeeding frame, (4) combining the results of (1) and (2), and (5) combining the results of (1) and (3). Preferably, interpolation options are derived on a block basis and transmitted with coded motion vectors which may be compressed to make maximum use of the available bandwidth. The assistance signal may be transmitted within the vertical and/or horizontal blanking intervals of an interlaced television broadcast.

14 Claims, 7 Drawing Sheets

| MODE | CODEWORD |
|------|----------|
| 1    | 110      |
| 2    | 10       |
| 3    | 0        |
| 4    | 1110     |
| 5    | 1111     |

FIG. 9

DIGITALLY ASSISTED MOTION COMPENSATED DEINTERLACING FOR ENHANCED DEFINITION TELEVISION

BACKGROUND OF THE INVENTION

This invention relates to the use of assistance signals for improved image resolution in Enhanced Definition Television (EDTV).

Current U.S. television broadcast signals conform with a standard formulated by the National Television System Committee (NTSC), providing for 525 horizontal scan lines, a 4-to-3 screen aspect ratio, and allocation of a bandwidth of 6 megahertz per communications channel. This standard further calls for alternating transmission of the odd-numbered and the even-numbered scan lines.

As compared, e.g., with 35-mm motion-picture images, transmissions based on the NTSC standard produce images with less resolution of detail and a less appealing aspect ratio, and similar observations apply to a different standard for conventional resolution television known as PAL (Phase Alternation Line) in use elsewhere. In view of these shortcomings, and to improve upon current television image quality, there have been proposals for a new standard for so-called high-definition television (HDTV) with greater vertical and horizontal resolution. Practicable proposed systems are incompatible with reception by receivers in current use. As an alternative, systems have been proposed which retain compatibility with current receiver standards and which use an auxiliary, low-bandwidth channel of assistance information to help improve upon the quality of present-day broadcasts. Though sometimes also referred to as HDTV in the literature, such systems are more appropriately referred to as enhanced-definition TV (EDTV), and they may be considered as an interim to the introduction of HDTV.

The following are cited as background in the field of HDTV/EDTV:

U.S. Pat. No. 4,916,525, issued Apr. 10, 1990 to J. E. Drummond discloses a system in which compressed vertical resolution-enhancing image data is transmitted during the vertical flyback interval of an NTSC television signal. An appropriately equipped receiver can decompress the compressed image data and add the expanded lines of data to the normal image data of the NTSC signal in interlinear fashion. In a receiver not so equipped, the added data is simply ignored.

U.S. Pat. No. 4,967,263, issued Oct. 30, 1990 to C. B. Dieterich; U.S. Pat. No. 4,926,244, issued May 15, 1990 to M. A. Isnardi; the paper by M. A. Isnardi et al., "Encoding for Compatibility and Recoverability in the ACTV System", IEEE Transactions on Broadcasting, Vol. BC-33 (1987), pp. 116-213; and the paper by S. N. Baron et al., "An Evolutionary Approach to Advanced Television Services: The ACTV (Advanced Compatible Television) System" each discloses a four-component, wide-screen, NTSC-compatible EDTV transmission format in which the first component has the aspect ratio and bandwidth specifications of a standard NTSC signal, and in which the other three components contain new information which is added to the first component in a compatible manner to provide a wider aspect ratio and enhanced definition. The transmitter inserts compressed high-frequency components of the side panel information and horizontal-resolution-enhancing information in a portion of the bandwidth allocated to the chrominance signal, and also provides a vertical-temporal helper signal at baseband to be used by the EDTV receiver for deinterlacing the received signal. The vertical-temporal helper signal consists of the difference between a calculated temporal average value and the actual value of the missing progressive scan line.

U.S. Pat. No. 4,980,764, issued Dec. 25, 1990 to J. M. Henot discloses the use of a helper signal in the transmission of image blocks and superblocks.

B. Girod et al., "Motion-compensating Field Interpolation from Interlaced and Non-interlaced Grids", 2nd International Technical Symposium on Optical and Electro-Optical Applied Science and Engineering: Image Processing Symposium, Cannes, December 1985, pp. 1-8 discloses motion-compensated interpolation of non-interlaced and interlaced grids for minimizing blur and jerkiness.

M. Pecot et al., "Compatible Coding of Television Images, Part 1: Coding Algorithm", Image Communication Journal (Special Issue on HDTV), pp. 1-18 discloses optimization of band splitting and decomposition filters in sub-band coding of high-resolution image information.

G. W. Meeker, "High Definition and High Frame Rate Compatible N.T.S.C Broadcast Television System", IEEE Transactions on Broadcasting, Vol. 34 (1988), pp. 313-322 discloses a wide-screen, high-definition television system which is compatible with the present NTSC system. The transmitter inserts horizontal-resolution-enhancing information in the bandwidth reserved for the chrominance signal and provides within the NTSC bandwidth motion vectors to be used by the receiver for motion compensated deinterlacing for enhancing vertical resolution.

T. Fukinuki et al., "Extended Definition TV Fully Compatible with Existing Standards", IEEE Transactions on Communications, Vol. COM-32 (1984), pp. 948-953 and T. Fukinuki et al., "Extended-Definition TV Fully Compatible with Existing Standards—Proposal and Experimental Results", 1984 Winter TV Conference, pp. 354-367 disclose an EDTV system which is compatible with existing NTSC or PAL standards. Horizontal resolution is improved by the transmitter inserting high-resolution luminance components in unused portions of the bandwidth allocated to the chrominance signal. The high-resolution components are detected at an appropriately equipped receiver by field-to-field processing.

W. F. Schreiber et al., "A Compatible High-Definition Television System Using the Noise-Margin Method of Hiding Enhancement Information", SMPTE Journal, December 1989, pp. 873-879 discloses an NTSC receiver-compatible EDTV system in which digital audio and horizontal-resolution-enhancing information are inserted by the transmitter in excess chrominance bandwidth.

SUMMARY OF THE INVENTION

In a preferred EDTV technique, an assistance signal is produced and transmitted to enable a suitably equipped receiver to choose from a number of predetermined deinterlacing modes. The assistance signal is produced at the transmitter and indicates the best deinterlacing mode based on an analysis of a frame before transmission. The modes represent interpolation options for estimating lines missing in a current interlaced image field, thereby enhancing vertical resolution. For example, options may be predetermined as follows: (1) intraframe interpolation, (2) use of information from a preceding frame, (3) use of information from a succeeding frame, (4) combining/averaging of the results of (1) and (2), and (5) combining/averaging of the results of (1) and (3) Preferably, interpolation options are derived on a block basis and transmitted with coded motion vectors which may be compressed to make maximum use of the available bandwidth.

Advantageously, the assistance signal is transmitted in interlaced-compatible format so as not to affect reception of a conventional signal by receivers in current use. For example, the assistance signal may be transmitted within the vertical and/or horizontal blanking intervals of an interlaced NTSC or PAL television broadcast.

DETAILED DESCRIPTION

1. Transmitter

Figure 1:
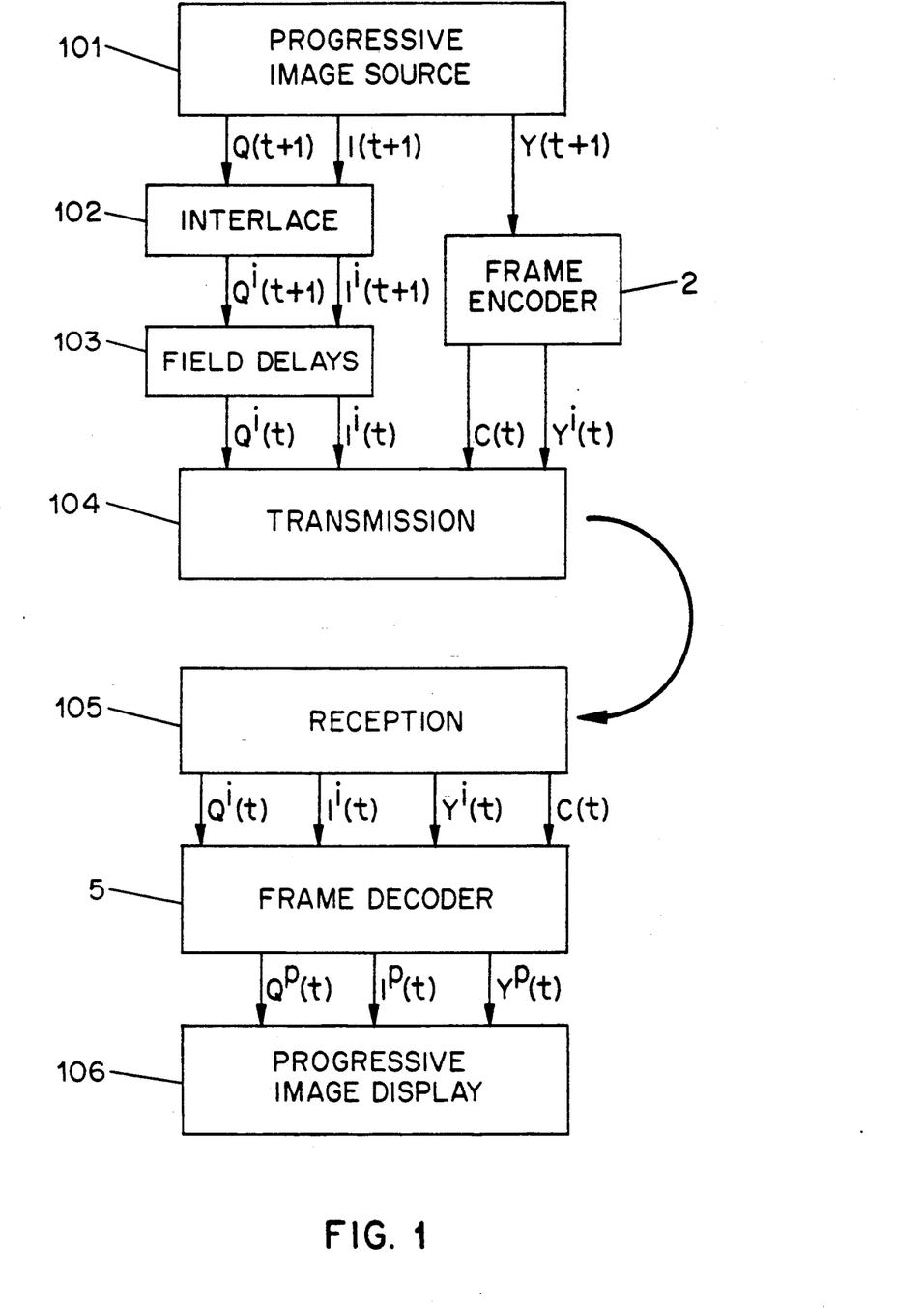
FIG. 1 is a block diagram of an EDTV system in accordance with a preferred embodiment of the invention.

Schematically depicted in the top half of FIG. 1 is an exemplary transmitter in a system in accordance with a preferred embodiment of the invention. Included in the transmitter are a progressive image source 101, interlacing means 102, field delay unit 103, frame encoder 2, and transmission unit 104.

Progressive image source 101 (e.g., a progressive scan camera) produces a digitized progressive image sequence over which coding operations are to be performed. Typically, in the case of a progressive scan camera, digitizing may be effected by internal analog-to-digital (A/D) conversion. In other cases, e.g., in the transmission of motion picture films, a separate digitizer may be used. The progressive image source further provides for the decomposition of images into three image components Q, I and Y, namely two chrominance components (Q and I) and a luminance component (Y) of an image.

Functional notation is used in the following for timing reference. Respective references are to a current frame time t, to a previous frame time $t-1$, and to a subsequent frame time $t+1$. Interlacing means 102 converts the two progressive chrominance frames $Q(t+1)$ and $I(t+1)$ into corresponding interlaced fields $Q^i(t+1)$ and $I^i(t+1)$ for transmission. As interlacing of a digitized progressive frame simply involves dropping either the odd or even lines (on an alternating frame basis), interlacing means 102 may be implemented effectively as a 2-to-1 demultiplexer under the control of an alternating counter.

Field delay unit 103 serves for delayed coupling, i.e., for producing field data $Q^i(t)$ and $I^i(t)$ at its output when field data $Q^i(t+1)$ and $I^i(t+1)$ are presented to its input. Optionally, field delay unit 103 may be implemented as a pair of separate, single-field delay units for image components Q and I.

While fields $Q^i(t)$ and $I^i(t)$ are being isolated as described above, frame encoder 2 generates the interlaced luminance field $Y^i(t)$ and the corresponding digital assistance stream C(t) as described below, taking as input the progressive luminance frame $Y(t+1)$. In this way, conveniently, the digital assistance stream is based on the luminance component only, to serve for the reconstruction of all three image components.

Once the three component interlaced fields have been separated, and the corresponding digital assistance stream generated, the resulting four components $Q^i(t)$, $I^i(t)$, $Y^i(t)$ and C(t) are passed to transmission unit 104, e.g., for broadcast transmission to receivers. For transmission compatible with existing television broadcasts, the components $Q^i(t)$, $I^i(t)$ and $Y^i(t)$ must be converted to analog form by a digital-to-analog (D/A) converter. The assistance stream C(t) may be transmitted over any of a variety of available low-bandwidth auxiliary channels. Preferably, for example, C(t) is placed in the vertical or horizontal blanking interval of interlaced broadcast signals in current use, so that standard interlaced receivers are not affected by the presence of the additional information. In this way, compatibility with present-day broadcasts is maintained, and no additional bandwidth is consumed.

It has been estimated that, currently, encoding of auxiliary digital information in blanking intervals can result in an assistance bit rate of 1.0 to 1.35 Mb/s; see F. W. P. Vreeswijk et al., "An HD-MAC Coding System", in: L Chiariglione, ed., *Signal Processing of HDTV*, pp. 137–143, Elsevier Science Publishers, B. V. (North Holland), 1988 and Y. Ninomiya et al., "An HDTV Broadcasting System Utilizing a Bandwidth Compression Technique—MUSE", *IEEE Transactions on Broadcasting*, BC-33(4), pp. 130–160, December 1987. Technological advances may lead to an increase in these values in the future.

2. Frame Encoder

Figure 2:
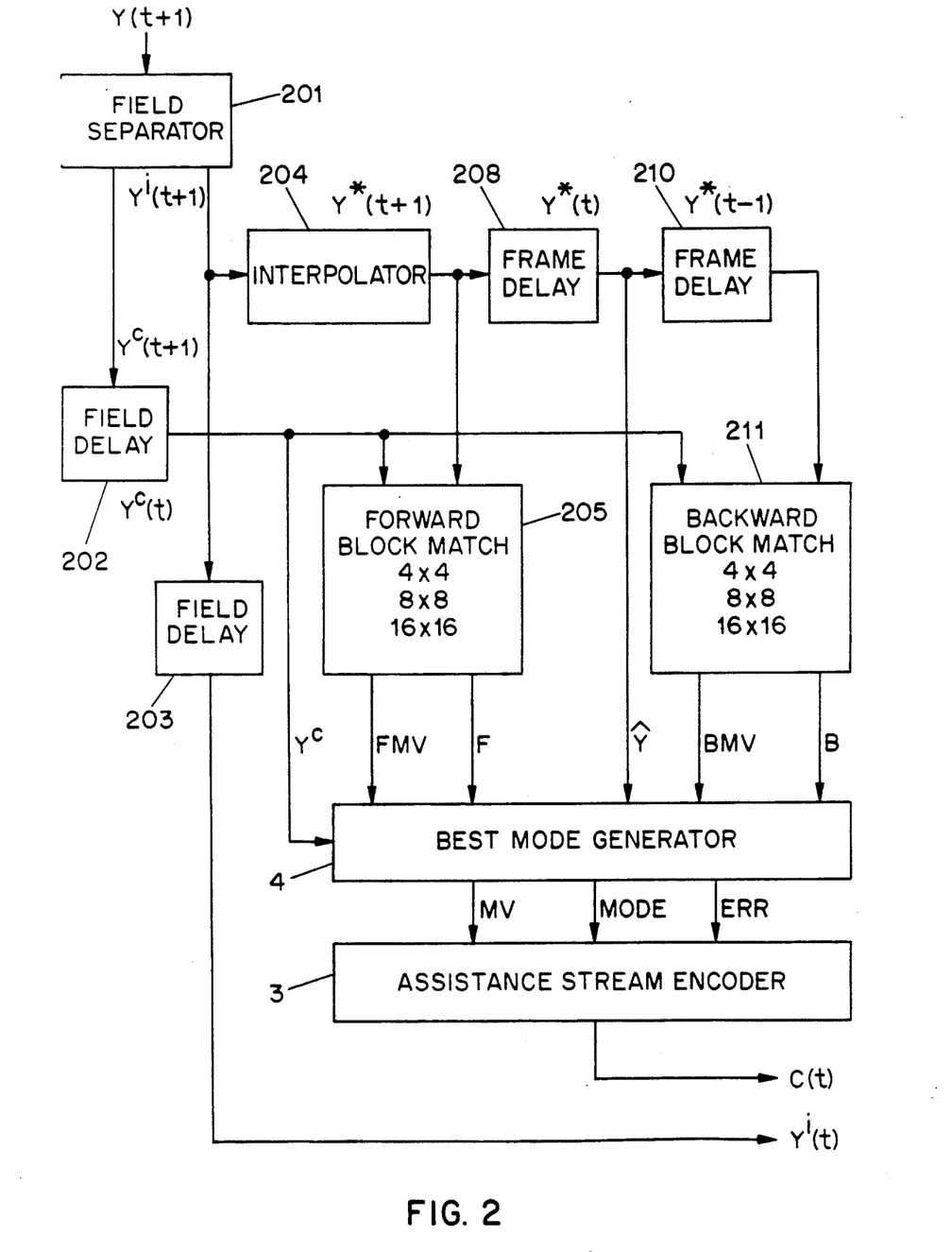
FIG. 2 is a block diagram of a frame encoder included in the EDTV system of FIG. 1.

FIG. 2 shows a frame encoder for generating the digital assistance stream C(t), and for separating the luminance field $Y^i(t)$ for interlaced transmission. Only the luminance $Y(t+1)$ is required as input for the frame encoding process. The frame encoder includes field separator 201, field delay units 202 and 203, interpolator 204, frame delay units 208 and 210, forward block matching means 205, backward block matching means 211, best-mode generator 4, and assistance stream encoder 3.

Field separator 201 splits the progressive frame $Y(t+1)$ into its odd and even component fields, so that the progressive sequence Y is converted into the interlaced sequence $Y^i$ for transmission and the interlaced sequence $Y^c$ for use in generating assistance data. The interlaced sequence $Y^i$ is made to alternate from frame to frame between the odd and the even fields of Y. Conversely, $Y^c$ alternates between the even and the odd fields of Y. Field separator 201 may be implemented with a multiplexer using an alternating counter for control, to gate the odd and even fields to field delay unit 202 and interpolator 204 in turn. As $Y^c(t+1)$ and $Y^i(t+1)$ are transferred to respective field delay units 202 and 203, $Y^i(t)$ is passed on for transmission. Frame delay units 208 and 210 serve for buffering of the progressive frames $Y^*(t)$ and $Y^*(t-1)$ for later use.

At the output of field delay unit 202, $Y^c(t)$ is fed simultaneously to forward block matching means 205 and backward block matching means 211 for block matching against the respective interpolated frames $Y^*(t+1)$ and $Y^*(t-1)$ as supplied, respectively, by interpolator 204 and frame delay unit 210. In an exemplary embodiment, interpolator 204 is implemented as a bilinear interpolator; other, possibly nonlinear interpolation means may be used instead.

For each block of pixels in $Y^c(t)$, block matching finds the corresponding block in the interpolated frame $Y^*$ which matches the given block most closely upon searching within a pre-defined region, e.g., a square or a rectangle. For both the forward and the backward matches found, the block matching means calculates a respective motion vector, and outputs the best-match-forward motion vector, fmv, and the best-match-backward motion vector, bmv. Block matching means 205 and 211 also transfers the respective best matching blocks, f and b, to best-mode generator 4 for error comparisons. Exemplary block matching seeks to determine, as accurately as possible, the best approximation for each block of $Y^c(t)$, to inform the receiver as to where to find each best match for deinterlacing the current frame Y using only the image information available at the receiving end. The approximations, b and f, are not transmitted to the receiver. Since $Y^c(t)$ is interlaced, and hence missing every other line, matching a K-by-L block involves groups of only K·L/2 pixels.

In an exemplary embodiment, the search for block matching is over a square, e.g., with −7 to +8 pixel displacements in both image directions, resulting in the generation of one 8-bit motion vector for each best match. As indicated in FIG. 2, each block matching means 205 and 211 may include circuits for matching at different block sizes, e.g., over 16×16, 8×8 and 4×4 blocks. Block matching as described above is well known in image processing, with a variety of implementations. One suitable block matching system is described in U.S. Pat. No. 4,897,720, issued Jan. 30, 1990 to L. Wu et al.

In choosing the best reconstruction mode, only the interpolated frames $Y^*(t+1)$, $Y^*(t)$ and $Y^*(t-1)$ are used, to approximate the field lines of each block of the field $Y^c(t)$. (Reconstruction modes or options are discussed below under the heading Best-Mode Generator.) Designated deinterlacing modes and associated motion vectors are encoded by assistance stream encoder 3, resulting in the generation of the digital code C(t). The inputs to assistance stream encoder 4 are: mode (best reconstruction mode), mv (motion vector), and err (match error).

3. Assistance Stream Encoder

Figure 3:
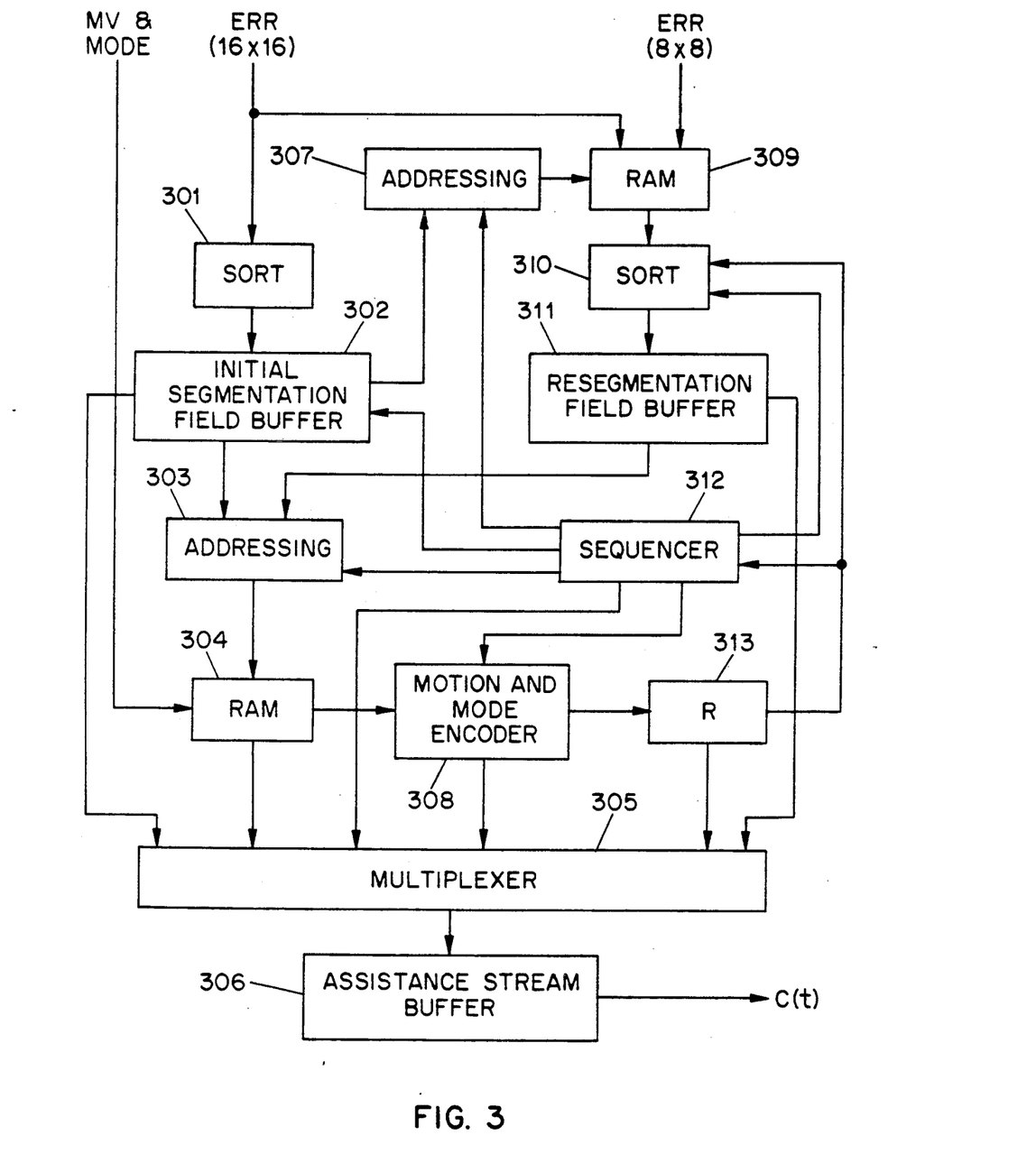
FIG. 3 is a block diagram of an assistance stream encoder included in the frame encoder of FIG. 2.

The assistance stream encoder of FIG. 3 includes sorting units 301 and 310, initial segmentation field buffer 302, addressing means 303 and 307, random access memories (RAM) 304 and 309, motion-and-mode encoder 308, resegmentation field buffer 311, sequencer 312, buffer 313, multiplexer 305, and assistance stream buffer 306.

In the generation of digital assistance data, sequencing is controlled by sequencer 312. The best-matched motion vectors and modes over all block sizes, generated by the best-mode generator 4 in the encoder of FIG. 2, are loaded into RAM 304 for later access. RAM 304 must have sufficient capacity for holding the best-matched modes and motion vectors on all three resolution scales, i.e., M·N/256+M·N/64+M·N/16 8-bit motion vectors and the same number of modes. With five modes as in the present example, this requires roughly $\log_2 5 \sim 2.32$ bits per mode. The best-matched block errors over the 16×16 and 8×8 block resolutions, err (also generated by best-mode generator 4 of FIG. 2), are loaded into sorting unit 301 as well as into a RAM 309 for later use if re-segmentation becomes possible. RAM 309 must be of sufficient size to hold M·N/256 match errors over the 16×16 block resolution. Sorting means 301 and 310 may be implemented by any one of a number of available fast sort algorithms or digital architectures.

Given D bits of digital assistance information per frame, and upon assignment of one bit to each 16×16 block to indicate whether or not that block is to be "quad-segmented" into four corresponding 8×8 blocks, P initial segmentations become possible, where P is the solution to the equation $$D = 42.288 \cdot P + 11.322 \cdot (M \cdot N/256 - P).$$

Here, the constant 42.288 corresponds to the number of bits needed to represent one segmentation bit, four 8-bit motion vectors, and 4 modes, and the constant 11.322 corresponds to the number of bits needed to represent one segmentation bit, one 8-bit motion vector, and one mode.

Sorting unit 301 finds the P largest best-match errors over the 16×16 block resolution, and loads the bit "1" into initial segmentation field buffer 302 for these blocks to be segmented, and "0" for all others. Since each bit in buffer 302 corresponds to a 16×16 block in the frame segmentation, a storage capacity of M·N/256 bits is required.

The contents of initial segmentation field buffer 302 are loaded into assistance stream buffer 306 through multiplexer 305 under the control of sequencer 312. Buffer 302 can also be used for indirect addressing of the motion vectors and modes stored in RAM 304 by addressing means 303. Each bit in buffer 302 maps to the location in RAM unit 304 of corresponding 16×16 and 8×8 block data for a given block of 16×16 pixels, i.e., each bit references the information of either one 16×16 block or four 8×8 blocks, including motion and mode information for a 16×16 pixel area in the image frame. Sequencer 312 then initiates an encoding process in motion-and-mode encoder 308, e.g., Huffman encoding. Since there usually is considerable redundancy in motion vectors and reconstruction modes between neighboring blocks, a compression technique such as differential pulse code modulation (DPCM) may be used advantageously to reduce the number of bits required to represent the motion field. Thus, advantageously, it is the difference of neighboring vectors which is encoded for transmission.

Figure 8A:
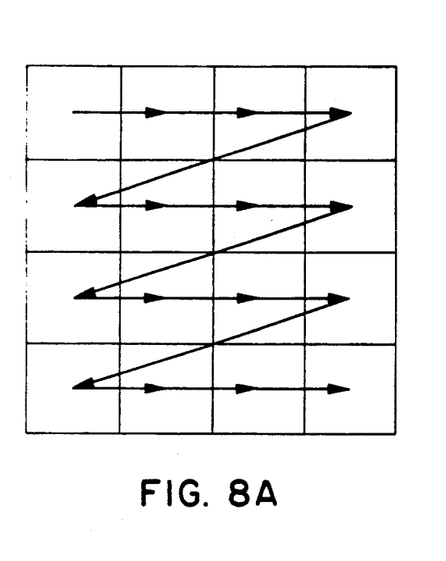
FIG. 8A is a diagram of the scanning order used in the MPEG encoding process.
Figure 8B:
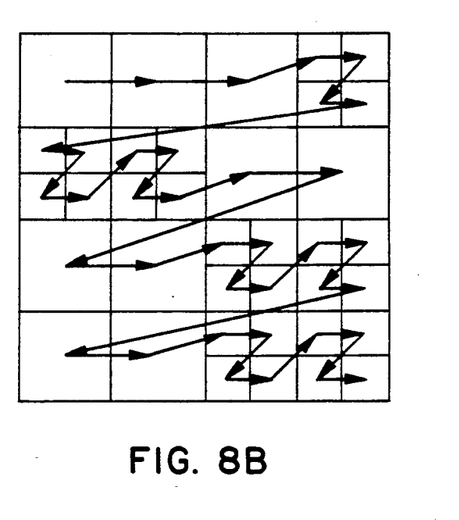
FIG. 8B is a diagram exemplifying a scan order for block-segmented motion.
Figure 9:
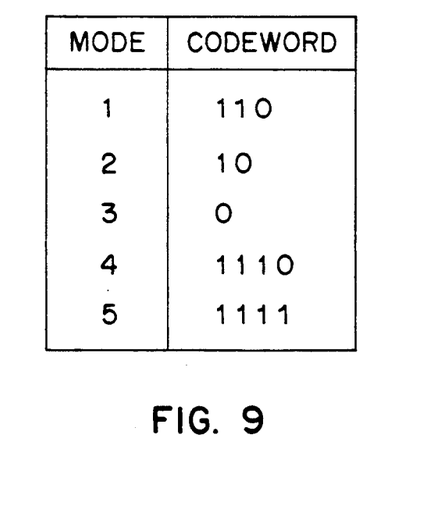
FIG. 9 is an experimentally derived code table.

Suitable for Huffman encoding are the MPEG-1 standard tables, for example, as found in *MPEG Video Committee Draft, ISO-IEC/JTC1/SC2/WG11, Coding of Moving Pictures and Associated Audio*, June 1991. As compared with the scan order of the MPEG encoding process, illustrated by FIG. 8A, a preferred scan order illustrated by FIG. 8B takes advantage of the fact that motion is encoded over a limited "quad-tree segmentation" of the motion vector field. The use of other suitable encoding methods is not precluded and, indeed, encoding of mode information may preferably be with reference to a customized encoding table as shown in FIG. 9. This table was constructed on the basis of an experimental determination of the relative frequencies of exemplary deinterlacing modes (1)–(5) described below, to the effect that the more frequently applied modes correspond to shorter words.

Addressing unit 303 provides for the transfer of the relevant motion vectors and modes of the blocks specified in the initial segmentation field to be coded, coding being performed over the 16×16 and 8×8 block resolutions as described. The generated code of length L bits is temporarily buffered within the encoder, and the number of possible re-segmentations, R, is found based upon the length of the resultant code as follows: given D bits of assistance data per frame, a resultant code length of L bits, requiring one segmentation bit per (possibly already segmented) block, and a code of length L bits, $$R = (D - L - S)/41.288,$$

where $$S = 3 \cdot P + M \cdot N/256$$

is the number of segmentation bits required to indicate possible re-segmentation. In this case, a previously non-segmented 16×16 block may be reduced to four 8×8 blocks, and an 8×8 block may become four 4×4 blocks. The constant 41.288 corresponds to the number of bits required to represent each of the four new 8-bit motion vectors and four associated modes. P is the number of initial segmentations. R is rounded down to an integer value and moved to buffer 313.

If R is greater than 0, sequencer 312 initiates resorting of match errors by sorting means 310. At this point, buffer 302 can again be used for indirect addressing of the relevant errors stored in RAM 309 through addressing means 307. The R largest reconstruction errors over the initial 16×16 and 8×8 segmentation are located, and the new re-segmentation field is loaded into resegmentation field buffer 311. For efficiency, resorting in unit 310 can be simultaneous with encoding in motion-and-mode encoder 308. Buffer 311 must be at least of size S bits. Also, when R is greater than 0, the sequencer 312 appends to the assistance stream buffer 306 first a tag bit of "1" (to indicate that resegmentation is possible and that compression of the initial segmentation will be used), and next the code in motion-and-mode encoder 308. Since the initial segmentation field stored in buffer 302 is of fixed length M·N/256 bits, the tag bit will always occupy bit location (M·N/256)+1 in the assistance stream and can therefore be identified by the decoder. Buffer 306 is then appended with the resegmentation field in buffer 311. Finally, sequencer 312 initiates the transfer of relevant resegmented modes and motion vectors from RAM 304 under the control of addressing means 303. The newly created resegmentation field is not compressed.

If R is 0, no re-segmentation is possible. In this case, sequencer 312 causes the tag bit "0" to be appended to buffer 306, indicating that Huffman compression is not used for this frame. Finally, the uncoded motion vectors and modes from RAM 304 are appended to buffer 306.

4. Best-Mode Generator

Figure 4:
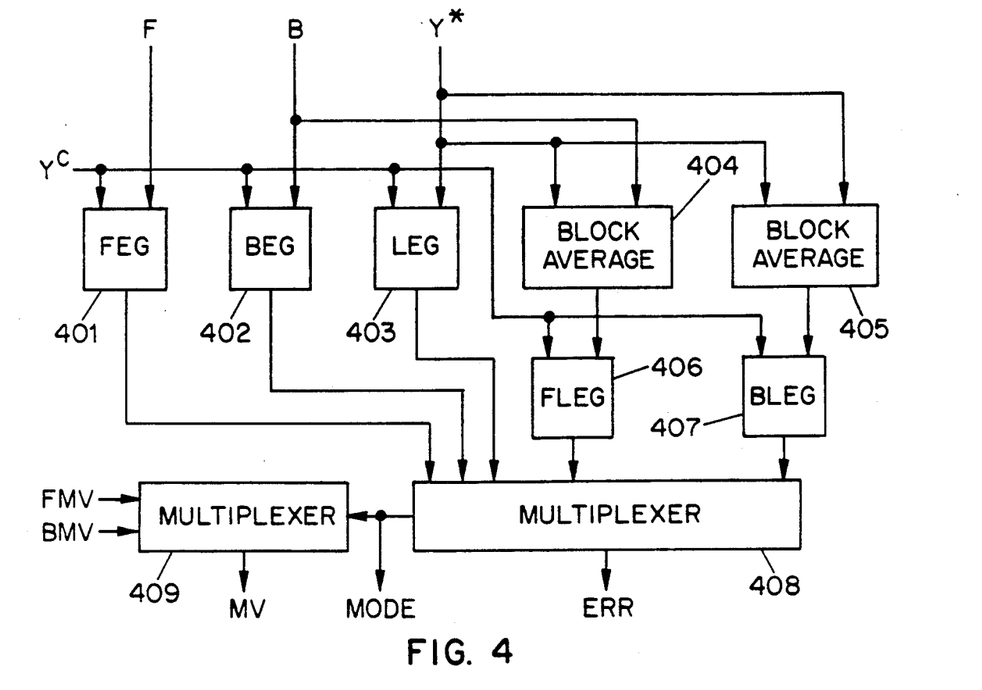
FIG. 4 is a block diagram of a best-mode generator included in the frame encoder of FIG. 2.

The best-mode generator of FIG. 4 includes error generator units 401, 402, 403, 406 and 407, block averaging units 404 and 405, and multiplexers 408 and 409. A search for the best interpolation mode is carried out at three resolution levels, 4×4, 8×8 and 16×16, e.g., by three separate processor subsystems. Given (a) a current field, $y^c$, to be reconstructed as best possible, (b) the best-matched forward block, f, with associated motion vector, fmv, (c) the best-matched backward block, b, with associated motion vector, bmv, and (d) the zero-motion linearly interpolated block, $y^*$, the best-mode generator produces (i) the motion vector, mv, (ii) the mode, and (iii) the error, err, associated with the best found match. Respective error generator units 403, 401, 402, 406 and 407 serve for calculating the match errors against (1) intra-frame linear interpolation, (2) the forward best match, (3) the backward best match, (4) the forward match averaged with linear interpolation, and (5) the backward match averaged with linear interpolation. Other error generator units are contemplated, e.g., to implement interpolation involving forward as well as backward matching. The errors are calculated only over those pixels which will not be transmitted. In this way, a best reconstruction mode for each block of non-transmitted field data is found on a block basis. Block averaging units 404 and 405 are used to generate the averaged blocks required and can be easily implemented with a counter and three block buffers coupled with an adder.

Multiplexer 408 serves for generating a mode based upon which of its inputs resulted in the lowest match error. Alternatively, a comparator could be used for this purpose. The best-mode signal then allows multiplexer 409 to pass the best-match motion vector as required. As intra-frame interpolation does not require a motion vector, none need be passed in this instance. Multiplexer 408 also passes the error associated with the best-match mode.

5. Receiver

The receiver shown in the bottom half of FIG. 1 includes reception unit 105, frame decoder 5, and progressive image display 106. Reception unit 105 receives the interlaced broadcast fields $Q^i(t)$, $I^i(t)$, $Y^i(t)$ and the assistance stream C(t), and provides A/D reconversion of these components when the coding process is used with present-day, interlaced, analog broadcast standards. In an exemplary EDTV system, this involves the extraction of the assistance stream C(t) from the vertical (and/or horizontal) blanking interval as described above. Alternatively, C(t) may be accessed through the auxiliary channel used for transmission.

Frame decoder 5 accepts as input the re-digitized, interlaced component field data $Q^i(t)$, $I^i(t)$, $Y^i(t)$ and the digital assistance stream C(t) for deinterlacing followed by generation of the progressive component frame data $Q^p(t-1)$, $I^p(t-1)$ and $Y^p(t-1)$ which are fed to a progressive image display 106 for viewing.

6. Frame Decoder

Figure 5:
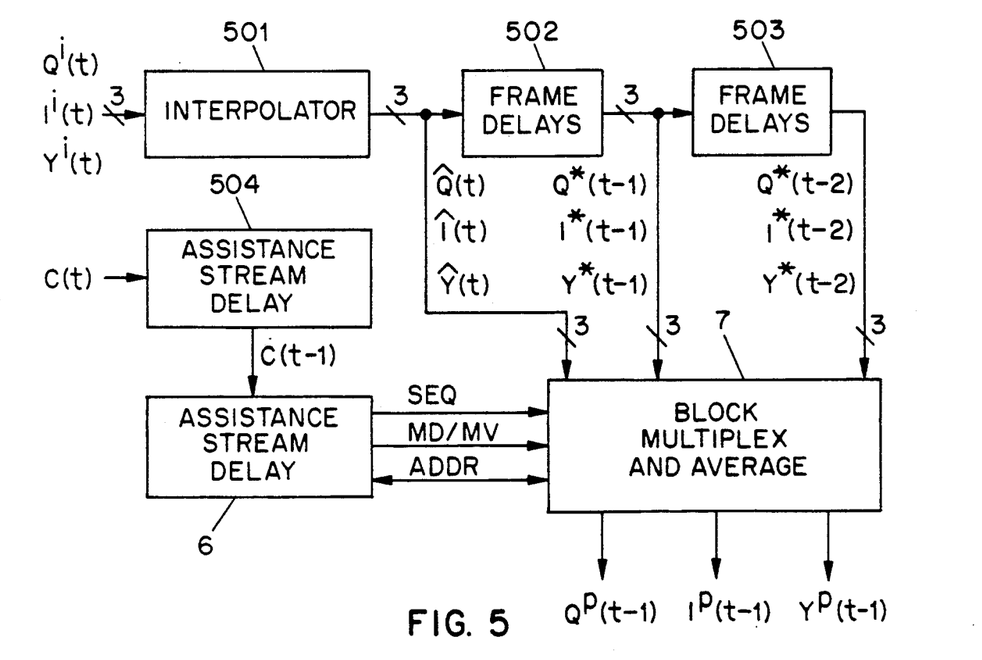
FIG. 5 is a block diagram of a frame decoder included in the EDTV system of FIG. 1.

The frame decoder of FIG. 5 includes interpolator 501, frame delay units 502 and 503, assistance stream delay unit 504, assistance stream decoder 6, and block multiplex and averaging unit 7. The three fields of digitized image data $Q^i(t)$, $I^i(t)$ and $Y^i(t)$ are passed through interpolator 501 which implements the same interpolation algorithm as the frame encoder of FIG. 2, thereby reconstructing the interpolated image data over which encoding was performed at the transmitter. For image reconstruction, interpolation is performed over all three fields, so that interpolator 501 represents three spatial interpolator units running in parallel. The resulting interpolations are passed through frame delay buffers 502 and 503, allowing access by block multiplex and average unit 7, at time t−1, to interpolated frames Q*(t), I*(t), Y*(t), Q*(t−1), I*(t−1), Y*(t−1), Q*(t−2), I*(t−2) and Y*(t−2). Analogous to interpolator 501, frame delay units 502 and 503 each consists of three individual frame buffers.

Assistance stream C(t) is buffered in delay unit 504 for one time unit during the deinterlacing of the frame data at time t−1, using C(t−1). Delay unit 504 must be of sufficient size to support D bits of data, D being the number of digital assistance bits available per frame as described above. From delay unit 504, C(t−1) passes to the assistance stream decoder 6 for conversion into (i) the required mode, md, (ii) motion vector, mv and (iii) addressing information for each block which will ultimately be used by unit 7 to complete the deinterlacing process, resulting in the generation of progressive frame data $Q^p(t-1)$, $I^p(t-1)$ and $Y^p(t-1)$ for display.

7. Assistance Stream Decoder

Figure 6:
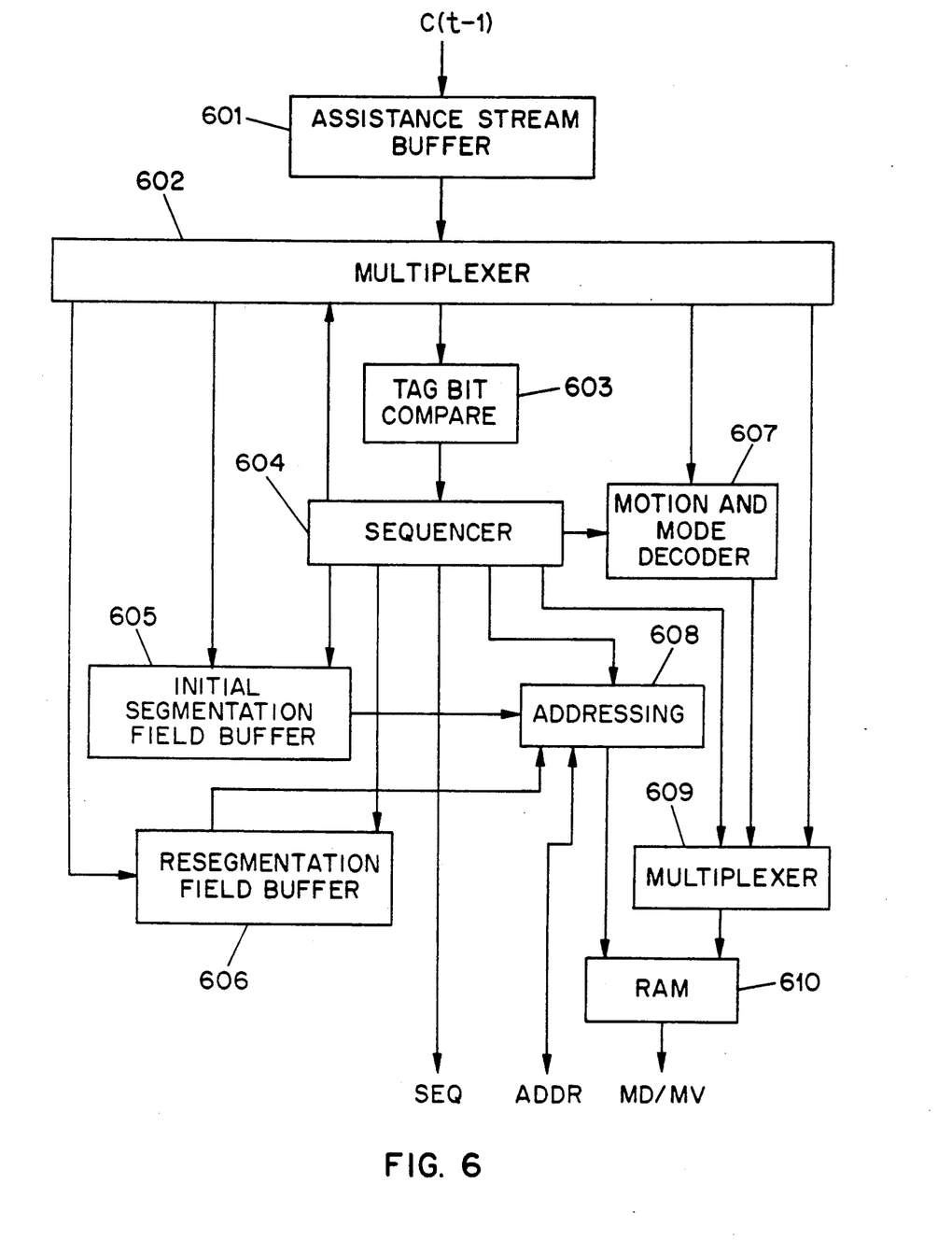
FIG. 6 is a block diagram of an assistance stream decoder included in the frame decoder of FIG. 5.

The assistance stream decoder of FIG. 6, for extracting the reconstruction operations required for deinterlacing each encoded block, includes assistance stream buffer 601, multiplexer 602, tag bit comparator 603, sequencer 604, initial segmentation field buffer 605, resegmentation field buffer 606, motion-and-mode decoder 607, addressing unit 608, multiplexer 609, and random access memory 610.

C(t−1) is initially moved to assistance stream buffer 601. Access to this buffer is under the control of multiplexer 602 which receives its commands from sequencer 604. Buffer 605 is loaded with the initial block segmentation information specified by the first (M·N)/256 bits of the assistance stream. The compression tag bit in bit location (M·N/256)+1 of the assistance stream is checked by comparator 603 to see if motion and mode compression has been used for this frame. A value of "1" indicates that the initial segmentation information has been compressed and causes sequencer 604 to initiate decoding in motion-and-mode decoder unit 607.

The decoded motion vectors and modes for each block are multiplexed into RAM 610 for later access by the block multiplex and average system 7. The re-segmentation field is read into buffer 606 and is used by addressing means 608, as the final set of uncompressed modes and motion vectors are loaded into RAM 610.

When the tag bit is "0", indicating that motion and mode information for this frame is not compressed, multiplexer unit 602 and addressing unit 608 are instructed to load RAM 610 directly with the uncoded motion vectors and modes for later access by block multiplex and average system 7. The latter is triggered by sequencer 604 and tied to the RAM 610 through addressing unit 608, for retrieving the stored modes and motion vectors.

8. Block Multiplex and Average

Figure 7:
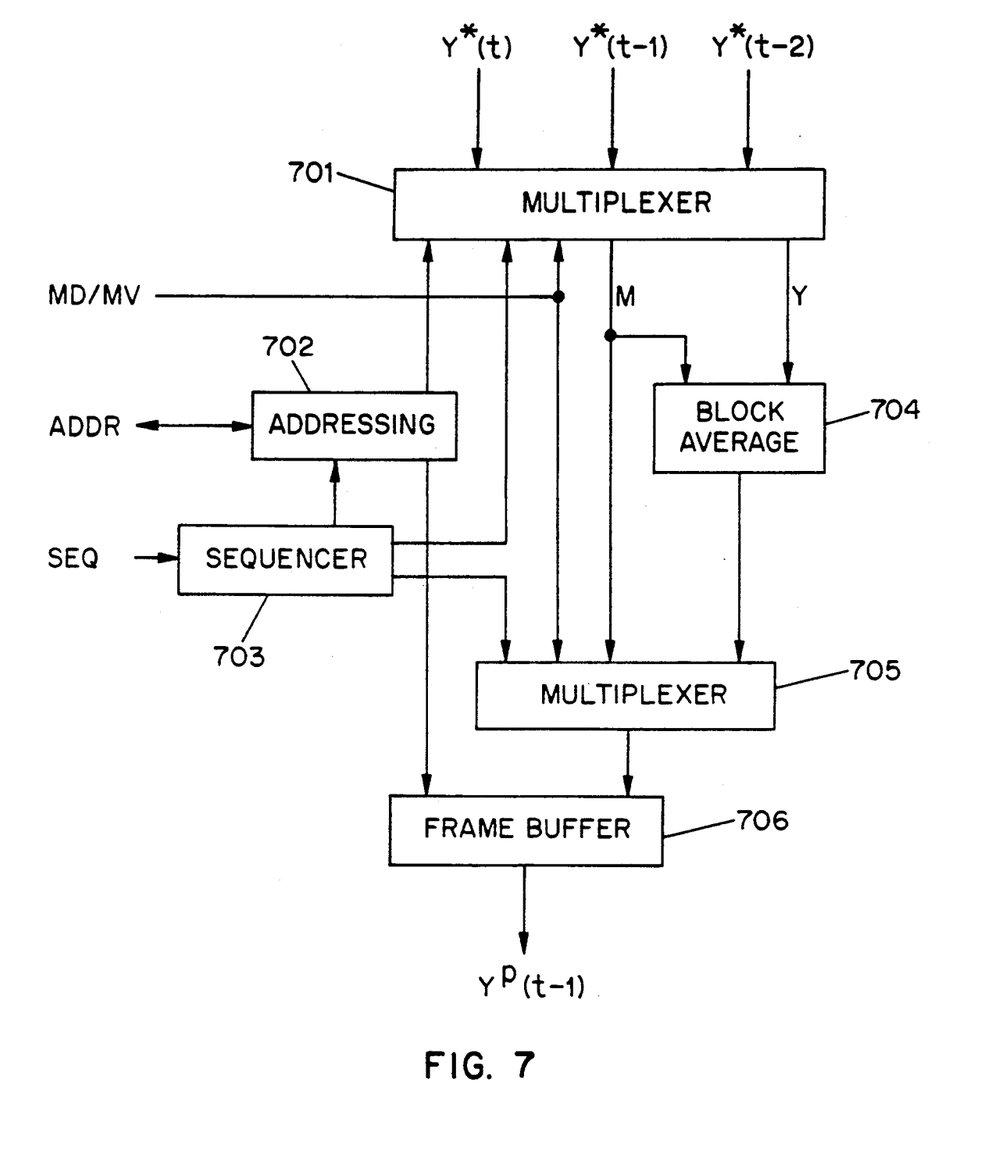
FIG. 7 is a block diagram of a block multiplexing and averaging subsystem included in the frame decoder of FIG. 5.

The block multiplexing and averaging system of FIG. 7 serves for the construction of the final image frame for display. It includes multiplexer 701, addressing unit 702, sequencer 703, block averaging unit 704, multiplexer 705, and frame buffer 706. Reconstruction based on the modes and respective motion vectors is the same for each of the luminance and chrominance components. For the sake of simplicity, only the decoding process for the luminance signal is shown.

Upon decoding of the assistance stream based on the specified segmentation fields as described above with reference to FIG. 6, block motion and modes are sequentially extracted from RAM 610 and used to multiplex the appropriate blocks from Y*(t), Y*(t−1) and Y*(t−2) through multiplexers 701 and 705 to the frame buffer 706, for storing the final deinterlaced image. Addressing unit 702 allows for appropriate information retrieval.

When the block retrieved from Y*(t) or Y*(t−2) is to be averaged with the corresponding zero motion block from the current intra-frame linear interpolation Y*(t−1), block average unit 704 provides for pixel-by-pixel averaging of these recalled blocks. In FIG. 7, m and y respectively represent the best-match recalled block and the zero-motion intra-frame linear interpolation block needed for the averaging process. Conveniently, block averaging means 704 may be implemented with an adder, a counter, and three block buffers: two for storage of the input blocks as they are being averaged, and one for buffering of the output block. A deinterlaced image may then be transmitted from frame buffer 706 to a suitable display, e.g., a television receiver.

We claim:

1. A method for transmitting a sequence of progressive image frames in an interlaced field format for deinterlacing by a receiver to provide a sequence of interpolated progressive image frames, the method comprising:
   deriving, for each one of the progressive image frames, (i) signals representing a corresponding interlaced image field and (ii) an associated assistance signal related to an interpolation process used to derive the associated missing interlaced image field from a corresponding progressive image frame, and specifying one of at least two predetermined deinterlacing modes for providing a corresponding interpolated progressive image frame from the signals; and
   transmitting the signals representing each respective interlaced image field and the associated assistance signal to the receiver.

2. The method of claim 1, wherein motion vector information is included in the assistance signal.

3. The method of claim 1, wherein the one of at least two predetermined deinterlacing modes specifies deinterlacing of a block in a segmentation of the image frame.

4. The method of claim 1, wherein at least one of the predetermined deinterlacing modes comprises intra-frame interpolation.

5. The method of claim 1, wherein at least one of the predetermined deinterlacing modes comprises referencing a preceding interlaced image frame.

6. The method of claim 1, wherein at least one of the predetermined deinterlacing modes comprises referencing a succeeding interlaced image frame.

7. The method of claim 1, wherein at least one of the predetermined deinterlacing modes comprises combining intra-frame interpolation with referencing a preceding interlaced image frame.

8. The method of claim 1, wherein at least one of the predetermined deinterlacing modes comprises combining intra-frame interpolation with referencing a succeeding interlaced image frame.

9. The method of claim 1, wherein the assistance signal is transmitted in a blanking interval between successive interlaced image frames.

10. The method of claim 1, wherein the assistance signal is derived from a luminance component of an interlaced image frame.

11. A method for deriving a sequence of interpolated progressive image frames from a corresponding sequence of interlaced image frames in a receiver having at least two predetermined deinterlacing modes, comprising:

receiving from a transmitter signals representing a sequence of interlaced image frames and associated assistance signals which are related to an interpolation process used in the transmitter to derive missing interlaced image fields from corresponding progressive image frames, and which specify one of the at least two predetermined deinterlacing modes; and deriving from the signals representing the transmitted interlaced image fields and the associated assistance information corresponding interpolated progressive image frames, using the deinterlacing modes specified by the assistance signal.

12. A transmitter for transmitting a sequence of progressive image frames in an interlaced field format for deinterlacing by a receiver to provide a sequence of interpolated progressive image frames, comprising:

means for deriving, for each one of the progressive image frames, (i) signals representing a corresponding interlaced image field and (ii) an associated assistance signal related to an interpolation process used to derive the associated missing interlaced image field from a corresponding progressive image frame, and specifying one of at least two predetermined deinterlacing modes for providing a corresponding interpolated progressive image frame from the signals; and means for transmitting the signals representing each respective interlaced image field and the associated assistance signal to the receiver.

13. A receiver for deriving a sequence of interpolated progressive image frames from a corresponding sequence of interlaced image frames, and having at least two predetermined deinterlacing modes, comprising:

means for receiving from a transmitter signals representing a sequence of interlaced image frames and associated assistance signals which are related to an interpolation process used in the transmitter to derive missing interlaced image fields from corresponding progressive image frames, and which specify one of the at least two predetermined deinterlacing modes; and means for deriving from the signals representing the transmitted interlaced image fields and the associated assistance information corresponding interpolated progressive image frames, using the deinterlacing modes specified by the assistance signal.

14. A system for producing a sequence of progressive image frames from a sequence of interlaced image frames, comprising:

a transmitter for transmitting a sequence of progressive image frames in an interlaced field format for deinterlacing by a receiver to provide a sequence of interpolated progressive image frames, and a receiver for deriving a sequence of interpolated progressive image frames from a corresponding sequence of interlaced image frames;

the transmitter comprising:

means for deriving, for each one of the progressive image frames, (i) signals representing a corresponding interlaced image field and (ii) an associated assistance signal related to an interpolation process used to derive the associated missing interlaced image field from a corresponding progressive image frame, and specifying one of at least two predetermined deinterlacing modes for providing a corresponding interpolated progressive image frame from the signals; and means for transmitting the signals representing each respective interlaced image field and the associated assistance signal to the receiver;

the receiver comprising:

means for receiving from the transmitter signals representing a sequence of interlaced image frames and associated assistance signals which are related to the interpolation process used in the transmitter to derive missing interlaced image fields from corresponding progressive image frames; and means for deriving from the signal representing the transmitted interlaced image fields and the associated assistance information corresponding interpolated progressive image frames, using the deinterlacing modes specified by the assistance signal.

* * * * *

UNITED STATES PATENT AND TRADEMARK OFFICE
CERTIFICATE OF CORRECTION

PATENT NO. : 5,305,104
DATED : April 19, 1994
INVENTOR(S) : Daryl K. Jensen et al.

It is certified that error appears in the above-indentified patent and that said Letters Patent is hereby corrected as shown below:

Col. 1, before line 5, insert -- The United States Government has certain rights in this invention pursuant to Contract CDR-881111 awarded by the National Science Foundation. --

Signed and Sealed this

Nineteenth Day of November, 1996

Attest:

BRUCE LEHMAN

Attesting Officer     Commissioner of Patents and Trademarks